(12) United States Patent
Ofner

(10) Patent No.: US 8,261,548 B2
(45) Date of Patent: Sep. 11, 2012

(54) SUPERCHARGED INTERNAL COMBUSTION ENGINE AND METHOD FOR MONITORING WHETHER THE CRANKCASE VENT HAS BEEN CONNECTED

(75) Inventor: Bernd Ofner, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 515 days.

(21) Appl. No.: 12/578,403

(22) Filed: Oct. 13, 2009

(65) Prior Publication Data
US 2010/0031936 A1   Feb. 11, 2010

Related U.S. Application Data

(63) Continuation of application No. PCT/EP2008/002134, filed on Mar. 18, 2008.

(30) Foreign Application Priority Data

Apr. 14, 2007   (DE) .......................... 10 2007 017 668

(51) Int. Cl.
*F02B 33/44*   (2006.01)
*G01M 15/00*   (2006.01)
(52) U.S. Cl. .................... 60/598; 73/114.02; 73/114.33; 73/114.37
(58) Field of Classification Search .................... 60/598; 73/114.02, 114.37, 114.33
See application file for complete search history.

(56) References Cited

U.S. PATENT DOCUMENTS
5,714,683 A   2/1998  Maloney
7,080,547 B2  7/2006  Beyer et al.
2003/0106543 A1  6/2003  Gschwindt et al.
2004/0139796 A1  7/2004  Beyer et al.
2009/0072535 A1  3/2009  Baumann et al.
2010/0050754 A1*  3/2010  Roal et al. ................... 73/114.37
2011/0197864 A1*  8/2011  Karcher ........................ 123/574

FOREIGN PATENT DOCUMENTS

| DE | 39 32 300 A1 | 4/1991 |
|---|---|---|
| DE | 103 20 054 A1 | 11/2004 |
| DE | 10 2004 063 459 A1 | 7/2006 |
| DE | 20 2005 003 462 U1 | 7/2006 |
| DE | 10 2005 030 457 A1 | 1/2007 |
| EP | 1 310 639 A1 | 5/2003 |
| EP | 1 327 753 A1 | 7/2003 |

OTHER PUBLICATIONS

German Search Report dated Nov. 13, 2007 including partial English translation (Nine (9) pages).
International Search Report dated Oct. 8, 2008 including English translation (Five (5) pages).

\* cited by examiner

*Primary Examiner* — Mary A Davis
(74) *Attorney, Agent, or Firm* — Crowell & Moring LLP

(57) ABSTRACT

A supercharged internal combustion engine in a motor vehicle includes a venting device for the crankcase of the internal combustion engine and a compressor for supercharging the internal combustion engine. A discharge opening for discharging the crankcase gas is provided upstream of the compressor and a sensor for determining the charge pressure of the compressor is provided downstream of the compressor. The discharge opening is connected to the crankcase by a first connection for the airflow, in particular a hose connection. In order to cost-effectively monitor the venting of the crankcase of the internal combustion engine, an opening, to which the charge pressure of the compressor is applied, is provided downstream of the compressor. The first connection for the airflow includes a closing device for closing the opening to which the charge pressure is applied, wherein the closing device closes the opening if the first connection is connected to the discharge opening.

7 Claims, 1 Drawing Sheet

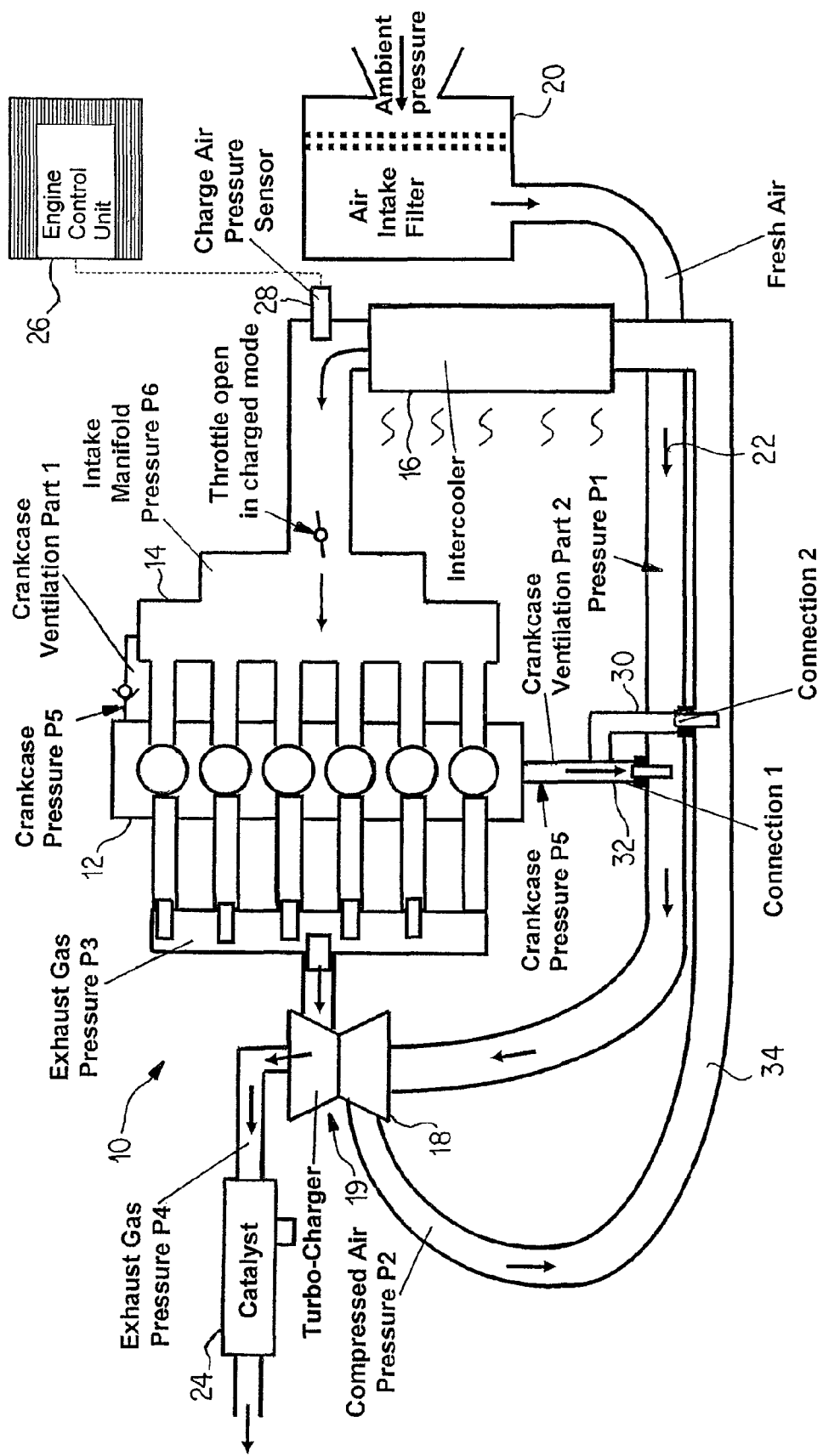

SUPERCHARGED INTERNAL COMBUSTION ENGINE AND METHOD FOR MONITORING WHETHER THE CRANKCASE VENT HAS BEEN CONNECTED

CROSS-REFERENCE TO RELATED APPLICATIONS

This application is a continuation of PCT International Application No. PCT/EP2008/002134, filed Mar. 18, 2008, which claims priority under 35 U.S.C. §119 to German Patent Application No. DE 10 2007 017 668.8, filed Apr. 14, 2007, the entire disclosures of which are herein expressly incorporated by reference.

BACKGROUND AND SUMMARY OF THE INVENTION

The invention relates to a supercharged internal combustion engine in a motor vehicle, which supercharged internal combustion engine includes a venting device for the crankcase of the internal combustion engine and a compressor for supercharging the internal combustion engine, in particular a supercharger or a turbocharger. A discharge opening for discharging the crankcase gas is provided upstream of the compressor and a sensor for determining the charge pressure of the compressor is provided downstream of the compressor. The discharge opening is connected to the crankcase by a first connection for the airflow, in particular a hose connection. A method is also provided for monitoring whether the first connection has been connected to the discharge opening.

Prior-art supercharged internal combustion engines in a motor vehicle include a venting device for the crankcase of the internal combustion engine and a compressor for supercharging the internal combustion engine. A discharge opening for discharging the crankcase gas is provided upstream of the compressor and a sensor for determining the charge pressure of the compressor is provided downstream of the compressor. The discharge opening is connected to the crankcase by way of a hose connection.

The object of the invention is the cost-effective monitoring of the venting of the crankcase of the internal combustion engine.

This object is achieved, in terms of the device, by providing a supercharged internal combustion engine in a motor vehicle, which supercharged internal combustion engine includes a venting device for the crankcase of the internal combustion engine and a compressor for supercharging the internal combustion engine, in particular a supercharger or a turbocharger. A discharge opening for discharging the crankcase gas is provided upstream of the compressor and a sensor for determining the charge pressure of the compressor is provided downstream of the compressor. The discharge opening is connected to the crankcase by a first connection for the airflow, in particular a hose connection. An opening, to which the charge pressure of the compressor is applied, is provided downstream of the compressor. The first connection for the airflow includes a closing device for closing the opening to which the charge pressure is applied. The closing device closes the opening if the first connection has been connected to the discharge opening. In terms of the method, the method monitors whether the first connection has been connected to the discharge opening. The output signal of the charge pressure sensor is used to check whether the charge pressure has dropped below a predefined threshold value. Advantageous embodiments of the invention are described herein.

According to the invention, the internal combustion engine known from the prior art is improved by virtue of the fact that an opening, to which the charge pressure of the compressor is applied, is provided downstream of the compressor; the first connection for the airflow includes a closing device for closing the opening to which the charge pressure is applied, and the closing device closes the opening if the first connection has been connected to the discharge opening.

This improvement of the prior-art internal combustion engine enables a method for monitoring whether the first connection has been connected to the discharge opening.

BRIEF DESCRIPTION OF THE DRAWING

FIG. 1 is an exemplary block diagram of a supercharged internal combustion engine in accordance with the present invention.

DETAILED DESCRIPTION OF THE DRAWING

Referring to FIG. 1, there is shown an exemplary 6-cylinder inline single turbocharged internal combustion engine 10. A crankcase 12 includes an intake manifold 14 upstream of which is coupled an intercooler through which compressed air is fed from the compressor 18 of the turbocharger 19. Fresh air is fed through an air intake filter 20 to the compressor 18 via a fresh air intake path 22. Exhaust gas from the engine 10 fed to the turbocharger 19 is exhausted through the catalyst 24. An engine control unit (ECU) 26 is operatively coupled for controlling the engine. In particular, a charge air pressure sensor 28 arranged downstream of the intercooler 16 provides a charge air pressure sensor signal to the ECU 26.

As illustrated in FIG. 1, various pressures P1-P6 exist within the single turbocharged internal combustion engine 10. In order to provide crankcase ventilation, when the turbocharger 19 is inactive, the pressure difference between the intake manifold pressure P6 and the crankcase pressure P5 allows for crankcase ventilation (P6<P5).

When the turbocharger 19 is active, however, the intake manifold pressure P6 is greater than the crankcase pressure P5, and therefore a second path is necessary for providing crankcase ventilation. Here, the lower pressure P1 in the fresh air intake path 22 is used to provide the crankcase ventilation, wherein P1<P5.

On-board vehicle diagnostics are used to monitor the crankcase ventilation. In particular, various governmental regulations require that such monitoring ensures that the crankcase ventilation hose is properly coupled to the fresh air intake path so that hydrocarbons are not emitted into the atmosphere. Here, the hose is configured such that the crankcase ventilation can only be connected 32 to the fresh air intake path 22 if it is also coupled 30 to the compressed air path 34 at the same time. Accordingly, if the connection 32 is not fixed, then the connection 30 can also not be fixed and a hole/leakage will occur in the compressed air path 34, which hole/leakage is readily detected via the charge air pressure sensor 28 that is standard on supercharged engines. In this manner, no additional sensors are necessary for ensuring that the crankcase ventilation hose is properly coupled to the fresh air intake path 22 in order to prevent the emissions of hydrocarbons into the atmosphere.

For mounting the first connection 32 for the airflow at the discharge opening, preferably by way of a form-fitting snap-fit connection, the opening, to which the charge pressure of the compressor is applied, must also be necessarily closed according to the invention due to its geometry, preferably again by way of a form-fitting snap-fit connection. According to the invention, the first connection for the airflow and the closing device provided thereon for closing the opening, to which the charge pressure is applied, have a geometry of such type that the first connection 32 for the airflow can be connected to the discharge opening in a largely gas-tight manner only if the opening 30, to which the charge pressure is applied, is additionally closed by the closing device at the same time during the mounting process. For this purpose, the closing device is preferably provided with a mechanically largely rigid design and is also rigidly connected to the first connection for the airflow, particularly in the region of the connection to the discharge opening.

If the mounting of the first connection 32 for the airflow at the discharge opening is forgotten or not carried out correctly, the opening 30, to which the charge pressure of the compressor is applied, is likewise either not closed at all or not closed sufficiently. An appropriately large opening selected according to the invention optionally results in a significant pressure loss downstream of the compressor 18. The charge pressure sensor 28 already present there detects, according to the invention, that the pressure is too low. The monitoring of a correct connection of the crankcase vent can thus be carried out elegantly and cost-effectively as provided herein.

In an improvement of the method, a diagnostic device 26, which determines the current charge pressure with the aid of the output signal of the charge pressure sensor 28 and compares the charge pressure determined to the predefined threshold value, is provided in the motor vehicle. For this purpose, the known software of the control unit evaluating the signal of the charge pressure sensor can be supplemented accordingly in a less expensive manner.

In an embodiment of the invention, the diagnostic device comprises a fault memory and a corresponding entry is made in the fault memory if the value falls short of a predefined threshold value.

According to an improvement of the invention, the corresponding entry in the fault memory is read out by a diagnostic device and a corresponding warning is given.

In an embodiment of the invention, the diagnostic device is an external-to-vehicle diagnostic device in a vehicle workshop and the warning is given to a service technician of the workshop.

In another embodiment of the invention, the diagnostic device is an in-vehicle diagnostic device and the warning is given to the driver.

The in-vehicle or external-to-vehicle diagnostic device enables regular monitoring and thus also rapid relief if the first connection has not been connected or is no longer connected properly to the discharge opening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supercharged internal combustion engine of a motor vehicle, comprising:
    a venting device for a crankcase of the internal combustion engine;
    a compressor for supercharging the internal combustion engine;
    a discharge opening for discharging crankcase gas into a fresh air intake path, the discharge opening being arranged upstream of the compressor;
    a sensor for determining charge pressure of the compressor, the sensor being arranged downstream of the compressor;
    a first flow connection for connecting the discharge opening to the crankcase;
    a second opening, to which the charge pressure of the compressor is applied, the second opening being arranged downstream of the compressor;
    a closing device included in the first flow connection, the closing device closing the second opening to which the charge pressure is applied;
    wherein the closing device closes the second opening if the first flow connection is connected to the discharge opening; and
    wherein if the first flow connection is disconnected causing leakage at the discharge opening, the closing device is disconnected from the second opening.

2. A method for monitoring in a supercharged internal combustion engine comprising a compressor for supercharging the supercharged internal combustion engine; a discharge opening for discharging crankcase gas into a fresh air intake path, the discharge opening being arranged upstream of the compressor; a second opening being arranged downstream of the compressor; a sensor for determining charge pressure of the compressor, the sensor being arranged downstream of the compressor; a first flow connection includes connecting the discharge opening to the crankcase and a closing device that closes the second opening, the monitoring method comprising the acts of:
    sensing the charge pressure of the compressor of the supercharged internal combustion engine via the sensor; and
    checking whether the charge pressure has fallen below a predefined threshold value indicative of whether the first air flow connection is connected to the discharge opening and the second opening.

3. The method according to claim 2, wherein the sensing and checking acts are performed via a diagnostic device provided in a motor vehicle.

4. The method according to claim 3, wherein the diagnostic device comprises a fault memory, the method further comprising the act of making a corresponding entry in the fault memory if the charge pressure drops below the predefined threshold value.

5. The method according to claim 4, further comprising the act of reading-out the corresponding entry in the fault memory and providing a corresponding warning signal.

6. The method according to claim 5, wherein the act of reading-out the corresponding entry is performed by an external-to-vehicle diagnostic device provided in a vehicle workshop, and wherein the warning is providable to a service technician.

7. The method according to claim 5, wherein the corresponding entry is read out by an in-vehicle diagnostic device and the corresponding warning is providable to a driver of the motor vehicle.

* * * * *